United States Patent [19]

Olmsted

[11] 4,390,081

[45] Jun. 28, 1983

[54] SAWHORSE AND SAWHORSE KIT AND METHOD OF PACKAGING THEREOF

[75] Inventor: James H. Olmsted, Boulder, Colo.

[73] Assignee: McCoy Industries, Inc., Denver, Colo.

[21] Appl. No.: 211,625

[22] Filed: Dec. 1, 1980

[51] Int. Cl.[3] ...................... B27B 21/00; F16M 11/00; B65B 3/04

[52] U.S. Cl. .................................... 182/151; 182/181; 182/224; 53/474

[58] Field of Search ............... 182/151, 181, 186, 226, 182/224; 53/474

[56] References Cited

U.S. PATENT DOCUMENTS

| | | | |
|---|---|---|---|
| 2,343,557 | 3/1944 | Johnson | 182/186 |
| 3,379,282 | 4/1968 | Knuth | 182/151 |
| 3,760,903 | 9/1973 | Thompson | 182/181 |
| 4,105,091 | 8/1978 | Mahan | 182/151 |
| 4,182,432 | 1/1980 | Cossitt | 182/151 |

*Primary Examiner*—Reinaldo P. Machado
*Attorney, Agent, or Firm*—Bruce G. Klaas

[57] ABSTRACT

A sawhorse kit is disclosed having a top piece, leg members, brace members and fastener members. Channels, adapted to receive and seat a top portion of the leg members are formed in the top piece a sufficient distance from its ends to provide a work surface on the top piece longitudinally outward from the channels. When received and seated in the channels, the leg members extend downwardly and outwardly from a plane including the longitudinal axis of the top piece, and downwardly and outwardy from a plane transverse to the longitudinal axis of the top piece and bisecting the top piece. Passages, adapted to receive and securely retain the fastener members, are provided in the top piece, leg members and brace members to facilitate assembly of the sawhorse kit.

The sawhorse kit is arranged for packaging by orienting the kit components in a five layer, stacked relationship having a generally right angled, hexahedronal peripheral configuration with two of the layers having a leg member and a brace member arranged in end to end relationship, two of the layers containing leg members, and one layer containing the top piece. The stacked kit components are then contained in a packaging structure having a length about the same as, or slightly longer than, the longitudinal length of the top piece, a width about the same as, or slightly wider than the height of a brace member, and a height about the same height as, or slightly higher than, the stack height of the kit components.

5 Claims, 8 Drawing Figures

SAWHORSE AND SAWHORSE KIT AND METHOD OF PACKAGING THEREOF

BACKGROUND AND SUMMARY OF THE INVENTION

This invention generally relates to article support structures or testles, and more particularly to sawhorse kits and methods of packaging thereof.

With the rising costs of housing, more and more emphasis is being placed on home improvement as a means of raising a person's standard of living rather than on purchasing bigger or better housing, which for a large segment of the consuming public has become highly impractical if not impossible. This emphasis on home improvement has resulted in a significant proportion of the general population becoming involved in various kinds of do-it-yourself home improvement projects requiring not only the various tools of the construction trade, such as saws, drills, sanders and the like, but also the need for inexpensive sawhorse-type article support structures.

In the past, the general population has been faced with building a sawhorse-type structure from raw materials such as wood, which can be a highly time consuming process for an unskilled worker, or purchasing a preassembled sawhorse or sawhorse kit. Of the sawhorse kits which have previously been available, many require cutting of components prior to assembly or have been difficult to assemble. For example, bracket devices generally available on the market have required the worker to cut legs and an article support surface prior to assemblage and retention of these components in a predetermined configuration by means of the brackets. Many of the preassembled sawhorse-type article support structures which have previously been available have been weak in design, highly costly, heavy, and/or difficult to transport and store. Examples of various sawhorse-type article support structures of the prior art are shown in U.S. Pat. Nos. 652,517; 758,130; 841,931, 906,076, 1,257,033, 1,442,353, 1,960,991, 2,197,187, 2,343,557, 2,634,172, 3,080,015, 3,103,988, 3,721,316, 3,848,700, 4,071,113, 4,122,918 and 4,182,432.

In order to avoid some of the foregoing problems, a sawhorse kit has previously been suggested in U.S. Pat. No. 3,760,903 of Thompson having an elongated article support member defining four beveled surfaces, four leg members and gussets defining leg receiving channels along the entire length of the gusset sides. It appears, however, that the sawhorse structure disclosed in the Thompson patent may be inherently structurally weak in its design. For example, the beveled surfaces of the Thompson sawhorse are placed at the ends of the article support member and thereby provide stabilizing support for the legs in only two directions. These surfaces are inclined in one direction only with respect to the article support member and therefore do not maximize stability of the assembled sawhorse. Since loading of the sawhorse tends to force the legs to spread away from the article support member, the gusset channels of the Thompson sawhorse would appear to be incapable of aiding the strength of the sawhorse structure and would appear to actually weaken its structural integrity by reducing material thickness. In addition, assembly of the sawhorse kit of the Thompson patent requires a separate measuring step and the use of worker discretion as to placement of fasteners, shown in the Thompson patent as nails.

It has now been found that a long lasting sawhorse having high structural integrity and being capable of supporting heavy loads can be quickly and easily assembled from a kit comprising a top piece having channels formed therein a sufficient distance from the ends of the top piece to provide a work space on the top piece longitudinally outward from the channels, leg members adapted to be received and seated in the channels, brace members and fastener members. When received and seated in the channels, the leg members extend downwardly and outwardly from a plane including the longitudinal axis of the top piece, and downwardly and outwardly from a plane transverse to the longitudinal axis of the top piece and bisecting the top piece. Passages, adapted to receive and securely retain the fastener members, are provided in the top piece, leg members and brace members to facilitate assembly of the sawhorse kit. The components are adapted to be arranged for packaging for transportation, display and/or storage by orienting the kit components in a five layer, vertically stacked relationship, having a generally right angled, hexahedronal peripheral configuration, with two of the layers having a leg member and a brace member arranged in end to end relationship, two of the layers containing leg members, and one layer containing the top piece. In a presently particularly preferred embodiment, the stacked kit components are then contained in a packaging structure having a length about the same as, or slightly longer than, the longitudinal length of the top piece, a width about the same as, or slightly wider than the height of a brace member, and a height about the same height as, or slightly higher than, the stack height of the kit components.

DESCRIPTION OF ILLUSTRATIVE EMBODIMENTS OF THE INVENTION

The sawhorse and sawhorse kit of the present invention provide an article support structure which can be readily and efficiently transported, stored and/or displayed in unassembled kit form, and which can be quickly and easily assembled by an unskilled person to form a rigid article support structure or sawhorse capable of supporting substantial loads.

Figure 1:
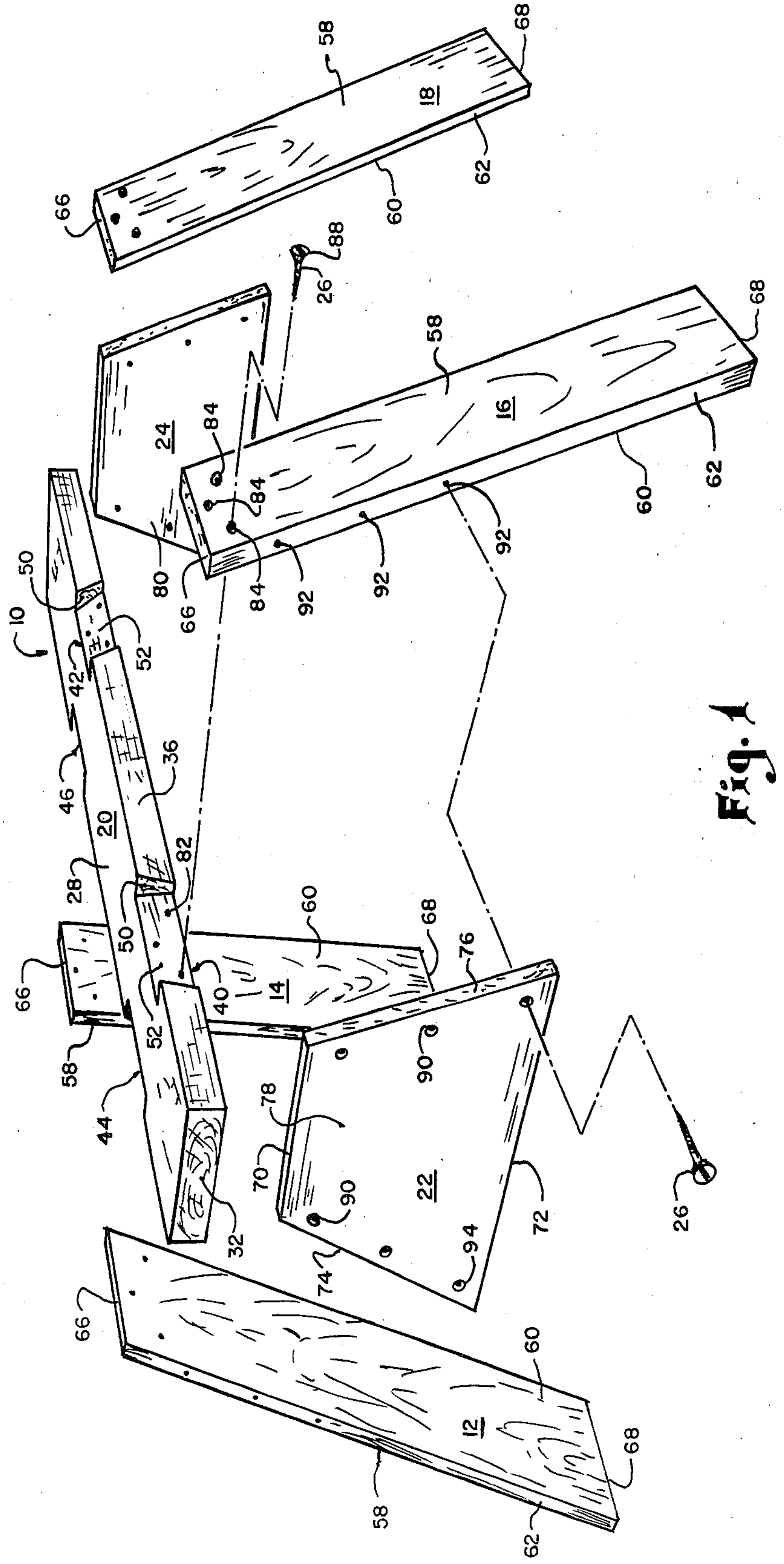
FIG. 1 is an exploded view of the sawhorse of the invention showing the relative orientation of the sawhorse components.
Figure 2:
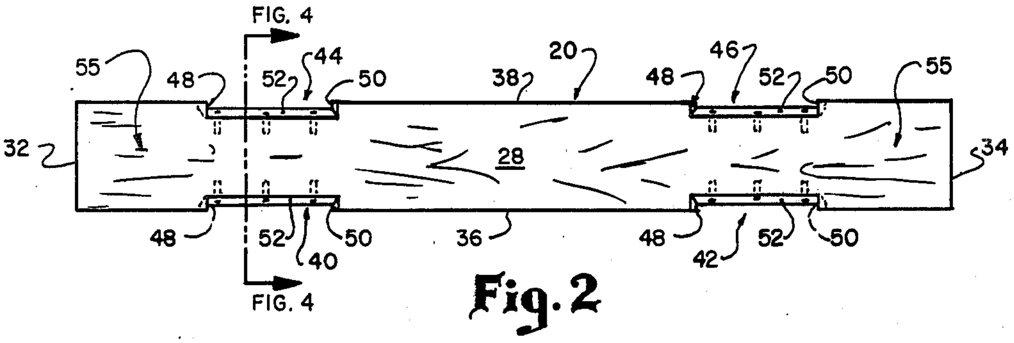
FIG. 2 is a top view of the top piece of the apparatus of FIG. 1.

Referring now to FIG. 1, the sawhorse and/or sawhorse kit 10 are shown in exploded, disassembled form to comprise four leg members 12, 14, 16, 18, an elongated top piece 20, at least two brace members 22, 24, and fastener means for securely fastening the leg members to the top piece and the brace members to the leg members.

Figure 3:
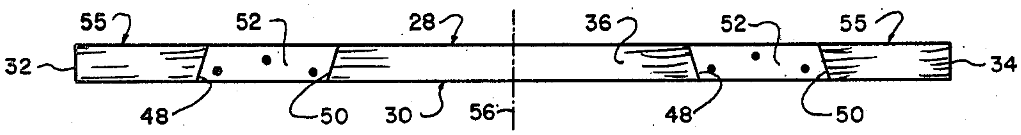
FIG. 3 is a side elevational view of the top piece of FIGS. 1 and 2.
Figure 4:
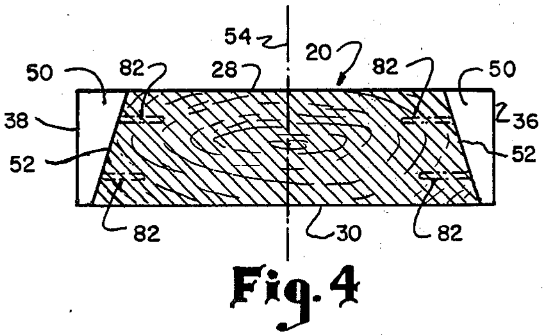
FIG. 4 is an end elevational view in cross section of the top piece of FIGS. 1, 2 and 3 taken along the line 4—4 in FIG. 2.

As shown in FIGS. 1, 2, 3 and 4, the elongated top piece 20 is formed with a generally rectangular cross-sectional configuration and is defined by relatively broad width, elongated top and bottom surfaces 28, 30, respectively, relatively narrow height end surfaces 32, 34, and relatively narrow height, elongated side surfaces 36, 38, the top surface 28 forming an article support surface in use of the apparatus. The top piece 20 is further defined by four channels 40, 42, 44, 46, with two channels being formed in each side surface 36, 38 of the top piece, the channels being adapted to receive and seat a top portion of the leg members, as is hereinafter further described. The channels 40, 42, 44, 46 are each defined by two opposed side abutment surfaces 48, 50, extending from the bottom surface 30 to the top surface 28 of the top piece, and by an interconnecting abutment surface 52 interconnecting side abutment surfaces 48, 50 so as to form a three sided channel. As best shown in FIG. 4, the channels 40, 42, 44, 46 extend from the bottom surface 30 of the top piece upwardly and inwardly toward a vertical plane, represented by line 54, including the longitudinal axis of the top piece, so that when the leg members are received and seated in the channels, the leg members will extend downwardly and outwardly from the plane represented by line 54. As best shown in FIG. 3, the channels also extend from the bottom surface 30 of the top piece upwardly and inwardly toward a vertical plane, represented by line 56, transverse to the longitudinal axis of the top piece and bisecting the top piece, so that when the leg members are received and seated in the channels, the leg members will extend downwardly and outwardly from the plane represented by line 56.

Referring to FIGS. 1 and 4, the channels are preferably recessed in the top piece in a manner such that the side abutment surfaces 48, 50 have a sufficient thickness, for example, on the order of ⅛", adjacent the bottom surface 30 of the top piece to provide stabilizing support for the leg members throughout the entire surface area of the side abutment surfaces. The channels are preferably further sized relative to the leg members so that when a top portion of the leg members is received and seated in the channels, the side and interconnecting abutment surfaces of the channels will be in snug, abutting relationship with edge surfaces and a side surface, respectively, of the leg members. In addition, the channels 40, 42, 44, 46 are spaced from the end surfaces 32, 34 of the top piece a sufficient distance to provide a work space, generally shown at 55, on the portion of the top surface of the top piece extending longitudinally outward from the channels to the end surfaces 32, 34 of the top piece. The work space 55 may be modified, such as by the drilling of holes (not shown) through the work space for subsequent mounting of article handling tools, such as vices, clamps and the like, or may be left unobstructed so as to function as part of the article support surface formed by top surface 28 of the top piece.

In a presently particularly, preferred embodiment the top piece is designed to have a length about the same as, or slightly longer than, the combined longitudinal length of a leg member and a brace member, and a width about the same as, or slightly less than, the height of a brace member, for a purpose to be hereinafter further described.

Figure 5:
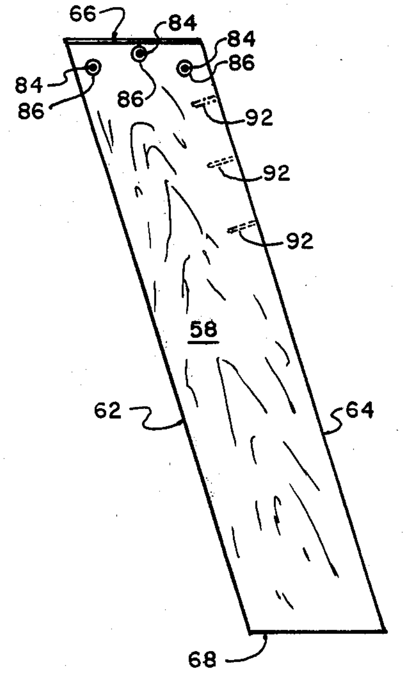
FIG. 5 is a side elevational view of a leg member of the apparatus of FIG. 1.

Referring now to FIGS. 1 and 5, leg members 12, 14, 16 and 18 are formed in a generally rectangular cross-sectional configuration as defined by relatively broad width, parallel, elongated outside side surfaces 58 and inside side surfaces 60, ralatively narrow width, parallel, elongated edge surfaces 62, 64 and parallel top and bottom surfaces 66, 68, respectively. The top and bottom surfaces of the leg members are inclined in a manner such that when each leg member is received and seated in a corresponding channel, the top surface 66 of each leg member is oriented parallel to, and is adapted to be located in, a plane including the top surface 28 of the top piece. The bottom surfaces 68 of the leg members are similarly inclined such that when each leg member is received and seated in a corresponding channel, the bottom surfaces 68 of the leg members are oriented in a generally coplanar relationship so as to provide stable support for the sawhorse on a generally planar sawhorse support surface (not shown), such as a floor, a concrete surface, the ground, or the like, with substantially all of the bottom surface 68 of each leg member being in supporting contact with the sawhorse support surface.

Figure 6:
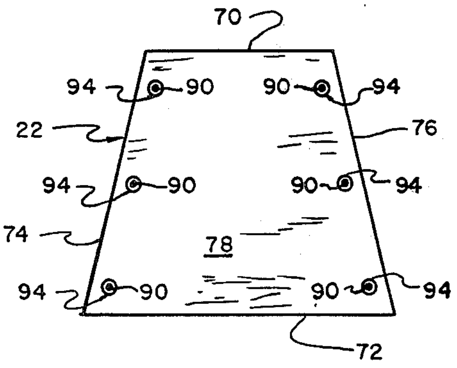
FIG. 6 is a side elevational view of a brace member of the apparatus of FIG. 1.

The sawhorse and/or sawhorse kit of the invention further comprises at least two brace members 22, 24 adapted to be placed in abutting engagement with the bottom surface 30 of the top piece and to extend between outside side surfaces 58 of opposed leg members, such as leg members 12 and 16, when the leg members are received and seated in the channels. As shown in the embodiment of FIGS. 1 and 6, an illustrative brace member 22 is defined by parallel relatively shorter length top surface 70 and relatively longer length bottom surface 72, by non-parallel edge surfaces 74, 76, and bt irregularly shaped front surface 78 and a corresponding parallel back surface (not shown). The brace members are designed such that when the leg members are received and seated in the channels of the top piece and the top surfaces 70 of the brace members are placed in abutting relationship with the bottom surface of the top piece, the edge surfaces 74, 76 of the brace members will extend between, and be oriented in coplanar relationship with, outside side surfaces 58 of opposing leg members, such as leg members 12 and 16. Although two brace members 22, 24 are shown in the illustrative embodiment of the drawings, a larger number of brace members may be employed. For example, two similar brace members may be employed adjacent opposite edge surfaces 62, 64 of each pair of opposing leg members. In addition, in a presently particularly preferred embodiment, the vertical distance from the bottom surface 72 to the top surface 70 of each brace member is preferably designed to be about the same as, or slightly wider than, the width of the side surfaces 58, 60 of the leg members and the width of the top and bottom surfaces 28, 30 of the top piece, for a purpose to be hereinafter further described.

The sawhorse and/or sawhorse kit of the invention further comprises fastener means for securely fastening the leg members to the top piece and the brace members to the leg members. As shown in the illustrative embodiment shown in the drawings, the fastener means comprises fastener members, such as screws 26, and passage means in the sawhorse kit components for receiving and securely retaining the fastener members. Although for purposes of illustration only two screws 26 are shown in the drawing of FIG. 1, it is apparent that more fastener members are required to complete assembly of the sawhorse kit. In addition, although screws are the presently particularly preferred fastener members to obtain a high strength, long lasting article support structure, other fastener members such as nails, bolts and the like may be employed for this purpose. In a presently particularly preferred embodiment the passage means comprises a plurality of passages extending from the interconnecting abutment surface 52 of each channel into the top piece as best shown in phantom at 82 in FIG. 4, three such passages being shown in each channel in the illustrative embodiment of the drawings, and a corresponding number of passages 84 extending through each leg member from the outside side surface 58 to the inside surface 60 of the leg member at a location adjacent the top end portion thereof. The passages 84 through the leg members are located in the top end portion of the leg members such as to be oriented in direct axial alignment with the passages 82 into the top piece when the leg members are received and seated in the channels with the top surface 66 of each leg member in a plane including the top surface 28 of the top piece. In a presently particularly preferred embodiment, passages 84 are countersunk on the outside side surfaces 58 of the leg members, as shown at 86 in FIG. 5, so that the heads 88 of the fastener members can be recessed beneath the outside side surfaces 58 of the leg members. The passage means further comprises a plurality of passages 90 extending through the brace members adjacent opposite edge surfaces 74, 76 thereof, six such passages being shown in the illustrative embodiment of the drawings, and a corresponding number of passages 92 extending into at least one of the edge surfaces 62 or 64 of the leg members. The passages 90 through the brace members are located adjacent the edge surfaces of the brace members such as to be in direct axial with the passages 92 in the leg members when the leg members are received and seated in the channels and the brace members are place in abutting engagement with the bottom surface of the top piece. The passages 90 may also be countersunk as shown at 94 so as to recess the heads 88 of the fastener members. As many passages 82 and corresponding passages 84, and passages 90 and corresponding passages 92, as desired may be employed to obtain a pre-determined fastening strength. In addition, the passages 82, 84, 90 and 92 are sized to facilitate insertion of the fastener members while providing sufficient resistance to securely retain the fastener members in the passages and to obtain a secure fastening relationship.

Figure 7:
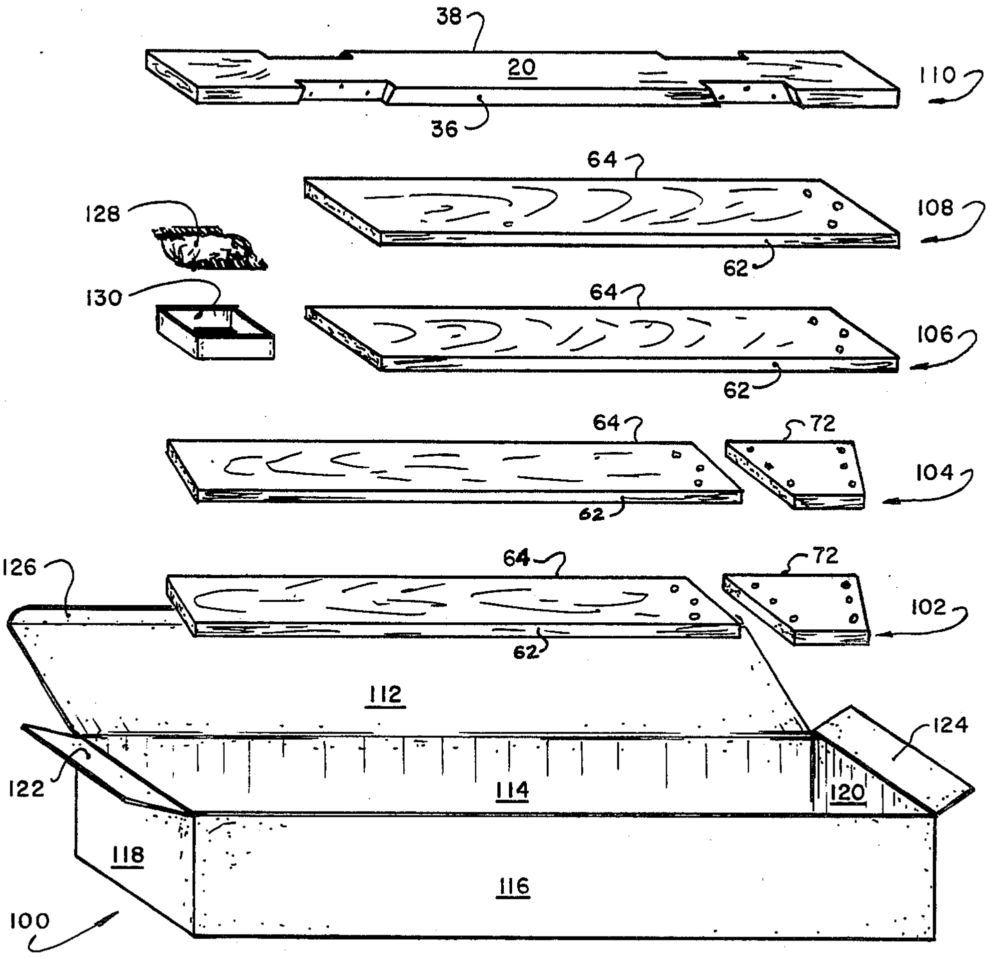
FIG. 7 is an exploded view showing an illustrative orientation of the sawhorse kit for packaging.

Referring now to the exploded view of FIG. 7, for ease of transportation, storage and/or display, the top piece, leg members, brace members and fastener members of the invention are provided with packaging means, generally shown at 100, adapted to hold and contain the disassembled sawhorse kit in a layered, stacked relationship. The components of the sawhorse kit are preferably maintained in a five layer, stacked configuration, comprising, for example, layers 102, 104, 106, 108 and 110, in package means having a length about the same length as, or slightly longer than, the longitudinal length of the top piece, and a height about the same height as, or slightly higher than, the combined stack height of the layers. Thus, in the embodiment shown in FIG. 7, package means 100 comprises a closeable package structure having an enclosed bottom wall (not shown), top wall 112, side walls 114, 116 and end walls 118, 120. The package structure may additionally be provided with side wall flags 122, 124 and top wall flap 126, hingedly connected to the side and top walls, respectively.

In the presently particularly preferred embodiment shown in FIG. 7, the sawhorse and/or sawhorse kit of the invention is designed in such a manner that the top piece of the sawhorse kit has a longitudinal length about the same size as, or longer than, the combined longitudinal length of, for example, elongated edge surface 64 of one of the leg members plus bottom surface 72 of one of the brace members. In addition, the height or perpendicular distance between the top and bottom surfaces 70, 72 of the brace members 22, 24 is designed to be about the same as, or slightly longer than the width of side surfaces 58 or 60 of a leg member and the width of top and bottom surfaces 28, 30 of the top piece. In this manner, the components of the sawhorse kit may be vertically stacked in a series of five layers in which a first layer and a second layer, such as layers 102, 104, each comprise one leg member and one brace member, a third layer and a fourth layer, such as layers 106, 108, each comprise one leg member, and a fifth layer such as layer 110, comprises a top piece. In addition, one of the layers, such as layer 106, having a combined component length less than that of the first or second layers, further comprises the fastener members, which may be enclosed, for example, in an envelope or package 128 and placed in a retainer insert 130. Of course, the layers 102, 104, 106, 108, 110 may be oriented in a different order than that shown in FIG. 7, the configuration of that figure being shown for purposes of illustration. In the five layer configuration as heretofore described, and upon vertical stacking, the sawhorse kit of the invention takes on the general peripheral form of a right angled hexahedron having a length corresponding to the length of the top piece, a width corresponding to the height of a brace member, and a height corresponding to the stack height of the stacked layers.

The packaging means of the invention is adapted to snugly receive and contain the five layered generally hexahedronal configuration of the vertically stacked sawhorse kit. Thus, the longitudinal length of the bottom wall, top wall 112 and side walls 114, 116, is designed to be about the same size as, or slightly longer than, the longitudinal length of the top piece, as heretofore described, and the height of side walls 114, 116 and end walls 118, 120 are designed to be about the same height as, or slightly higher than, the combined stack height of the five layer configuration of the disassembled sawhorse kit. In this manner, it is apparent that the sawhorse kit of the invention may be contained in an optimally minimally sized packaging means, and the desirable objectives of minimizing transportation, storage and display costs are obtained.

Figure 8:
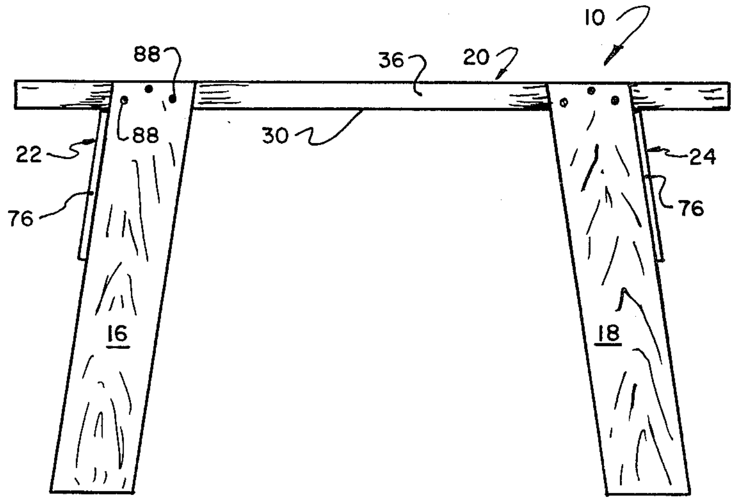
FIG. 8 is a side elevational view of the assembled apparatus of FIGS. 1 and 7.

In use of the sawhorse kit of the invention and in order to complete assembly of the sawhorse kit as shown in FIG. 8, the top piece, leg members, brace members and fastener members are removed from packaging means 100 and leg members 12, 14, 16, 18 are individually seated in channels 40, 42, 44, 46 so that the top surface portions 66 of the leg members are oriented in a plane containing top surface portion 28 of top piece 20 and the passages 84 through the leg members are in direct axial alignment with passages 82 extending into the top piece. Fastener members, such as screws 26, are then inserted through passages 84 and into passages 82, such as by screwing, to firmly secure the leg members to the top piece. Brace members 22, 24 are then oriented against the leg members with their top surface portions 70 in abutting engagement with the bottom surface portion 30 of top piece 20 and with passages 90 through the brace members in direct axial alignment with passages 92 into the leg members. Fastener members are then inserted through passages 90 and into passages 92 to firmly secure the brace members to the leg members and to complete assembly of the sawhorse kit.

It is apparent from the foregoing description that the sawhorse kit of the invention may be quickly and easily assembled in a matter of minutes by an unskilled person without making any measurements or marks and without modification of any components, the only tool required to complete assembly being a fastener member insertion tool, such as a screwdriver. Once assembled, the completed sawhorse of the invention provides a long lasting, high strength, stable article support structure, which may be subsequently disassembled as desired for ease of storage.

While the invention has been described in connection with presently particularly preferred illustrative embodiments, various modifications may be apparent from the foregoing description. Any such modifications are intended to be within the scope of the appended claims except insofar as precluded by the prior art.

What is claimed is:

1. A sawhorse kit, comprising;

four leg members, each having a rectangular cross-sectional configuration and being defined by relatively broad width, parallel outside and inside side surfaces, relatively narrow-width, parallel edge surfaces, and parallel top and bottom surfaces;

an elongated top piece having a rectangular cross-sectional configuration defined by relatively broad width top and bottom surfaces adapted to be oriented generally parallel to a generally planar support surface for the sawhorse, relatively narrow height, elongated side surfaces, and relatively narrow height end surfaces, the top piece having two channels defined in each side surface, each channel being defined by two opposed side abutment surfaces and by an interconnecting abutment surface, each channel being adapted to receive and seat a top end portion of one of the leg members so that the side and interconnecting abutment surfaces of the channel are in abutting engagement with a portion of the two edge surfaces and one of the side surfaces, respectively, of one of the leg members with the leg member extending downwardly and outwardly from a vertical plane including the longitudinal axis of the top piece and downwardly and outwardly from a vertical plane transverse to the longitudinal axis of the top piece and bisecting the top piece, the channels being spaced from the ends of the top piece a sufficient distance to provide a work space on portions of the top surface of the top piece extending longitudinally outward from the channels to the end surfaces of the top piece, the top piece having a longitudinal length about the same as, or longer than, the combined longitudinal length of one edge surface of a leg member plus the longitudinal length of a bottom surface of a brace member;

at least two brace members adapted to be placed in abutting engagement with the bottom surface of the top piece with each brace member extending between the outside side surfaces of opposing leg members on opposite sides of the top piece, the brace members having a perpendicular height from the bottom surfaces to the top surfaces thereof about the same height as, or slightly higher than, the width of the side surfaces of the leg members and the width of the top and bottom surfaces of the top piece;

fastener means adapted to securely fasten the brace members to the leg members and the leg members to the top piece;

the top and bottom surfaces of the leg members being inclined such that when when each leg member is received and seated in a channel, the top surface of each leg member is parallel to and falls in a plane including the top surface of the top piece while the bottom surfaces of the leg members are substantially coplanar so as to provide stable support for the sawhorse on a generally planar sawhorse support surface; and package means for containing the leg members, top piece, brace members, and fastener means in unassembled form, the package means having a length slightly longer than the longitudinal length of the top piece, a width slightly wider than the perpendicular height of one of the brace members, and a heigth slightly higher than the combined stack height of the leg members, the top piece and the brace members when the leg members, top piece and brace members are vertically stacked in five separate layers in a generally hexhedronal peripheral configuration with two layers each comprising one leg member and one brace member arranged in end to end relationship, two layers each comprising one leg member and one layer comprising the top piece, the package means being adapted to receive and enclose the sawhorse kit.

2. A method of packaging a sawhorse kit comprising a top piece, four leg members, and at least two brace members, the method comprising:

vertically stacking the top piece, leg members and brace members to form a stack having a generally hexahedronal peripheral configuration, enclosing the stack in packaging means adapted to receive and contain the stack; and the top piece, leg members and brace members are vertically stacked by forming two layers each comprising one leg member and one brace member arranged in end to end relationship, forming two layers each comprising one leg member, and forming one layer comprising the top piece, and then vertically stacking the layers.

3. The method of claim 2 wherein one of the layers further comprises fastener members for fastening and securing the leg members to the top piece and the brace members to the leg members.

4. The method of claim 3 wherein the top piece is designed to have a longitudinal length about the same as, or longer than, the combined longitudinal length of one leg member and one brace member; the brace members are designed to have a vertical height about the same as, or higher than, the width of the leg members and the width of the top piece; and the packaging means is designed to have a length about the same as, or slightly longer than, the longitudinal length of the top piece, a width about the same as, or slightly wider than the height of one of the brace members, and a height about the same as, or slightly higher than, the stack height of the stack.

5. A method of packaging components of a sawhorse kit in an elongated box of rectangular cross-sectional configuration, the components including an elongated top member of rectangular cross-section, four elongated support leg members of rectangular cross-sectional configuration which have equal lengths shorter than the length of said top member, two crossbrace members of identical parallelogram peripheral configuration with a maximum length less than the difference in length between said top member and said leg members, and a rectangular shaped package of fastening devices, the thickness of all components being substantially the same, and the method comprising:

placing one leg support member and one crossbrace member in parallel horizontally extending juxtaposition in the package to form a first layer of components;

placing another leg support member and the other crossbrace member in parallel horizontally extending juxtaposition in the package to form a second layer of components;

placing the other two leg support members in the package in vertically extending juxtaposition with a gap at one end thereof;

placing the package of fasteners in the gap between one end of the other two leg support members and an adjacent end wall of the package; and placing the top member in the package whereby the components are stacked on top of one another in five layers within the package.

* * * * *